Aug. 27, 1929.                H. G. CATHCART                1,726,471
                               BOTTLE CARRIER
                             Filed Oct. 13, 1927
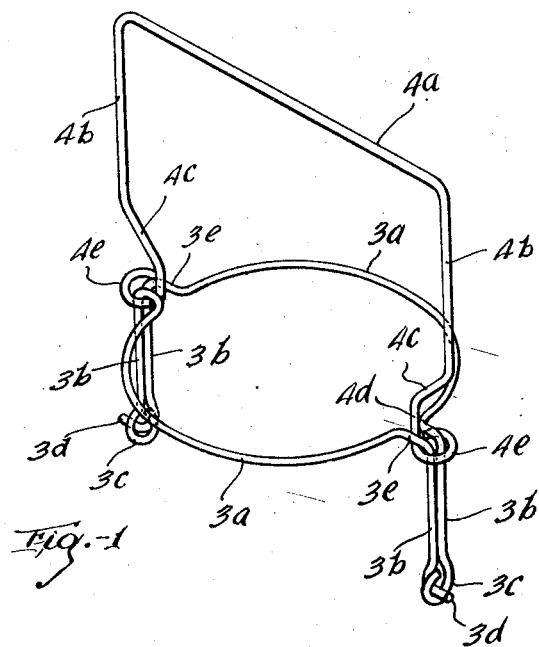
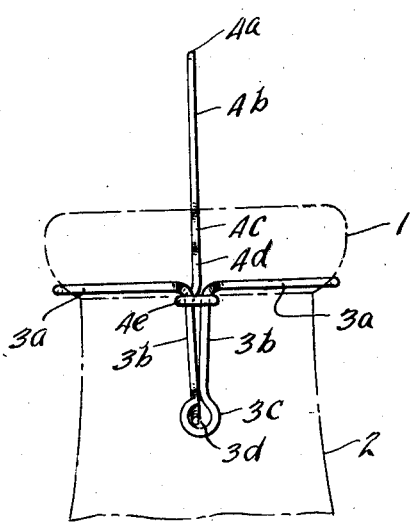
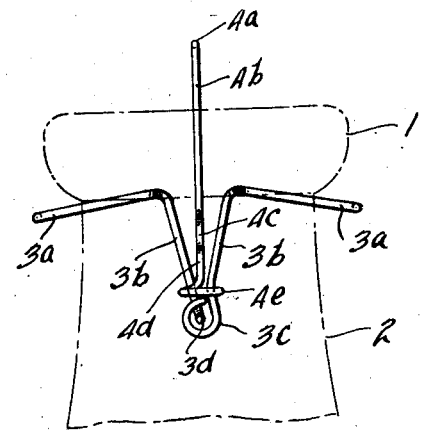
Inventor
Harry G. Cathcart
By John R. Wilburn
Attorney Patented Aug. 27, 1929.

1,726,471

UNITED STATES PATENT OFFICE.

HARRY G. CATHCART, OF CLEVELAND, OHIO.

BOTTLE CARRIER.

Application filed October 13, 1927. Serial No. 225,952.

This invention relates to an improved individual bottle carrier.

The object of this invention is to provide a bottle carrier which is adapted to engage under the bead around the mouth of a milk bottle or the like and which is of comparatively simple and yet efficient construction.

A further object is to provide such a holder in which the bottle gripping members are formed as duplicates and are adapted to be swivelly connected in such a manner as to be engaged by a handle member for closing and supporting the same.

Other objects will appear from the following description and claims when considered together with the accompanying drawing.

Fig. 1 is a perspective view of my improved device; Fig. 2 shows my device in closed position; Fig. 3 is a view similar to Fig. 2 except that it shows the holder in open position.

The bead 1 around the mouth of the bottle 2 is adapted to be engaged by the substantially semi-circular portions $3^a$ of the wire members, both of which have depending leg portions $3^b$ at diametrically opposite points. These bottle gripping members are formed as duplicates and are each provided with an eye $3^c$ at the lower end of one leg and a hook portion $3^d$ at the lower end of the other leg portion. These double parts are adapted to be swivelled together by reversing their relative arrangement so that the hook portion of the one will engage through the eye portion of the other, as will be clearly understood from Fig. 1. The leg portions are spaced somewhat outwardly from the semi-circular portions $3^a$ and the intermediate horizontal portions are indicated by reference numeral $3^e$.

The handle member is in the form of a bail which has the top transverse portion $4^a$, the vertically depending side portions $4^b$, the inwardly and downwardly extending portions $4^c$ and the other vertically depending portions $4^d$ which terminate in the eyes $4^e$. These eyes surround the leg portions $3^b$ of the bottle engaging members so as to slide thereon. The inclined portions $4^c$ are adapted to engage between the leg portions $3^b$ so as to force the bottle gripping members open when it is desired to release the holder from the bottle.

When it is desired to apply this holder to the neck of the bottle, it is merely necessary to engage the semi-circular portions $3^a$ down over the bead of the bottle and press down upon the handle when the portions $3^a$ are in such position. In this case, the semi-circular portions $3^a$ are spread down over the bead 1; and then when the holder has been lowered sufficiently, the handle is raised so as to slide the eyes $4^e$ up along the leg portions $3^b$. This action causes the bottle gripping portions $3^a$ to turn about their points of pivotal connection and to grip the neck of the bottle. The eyes $4^e$ engage under the transverse portions $3^e$ so as to support the portions $3^a$ in firm engagement under the bead 1. In this position, the bottle can be swung or shaken without danger of disengagement of the holder therefrom. The weight of the bottle during such swinging action tends to maintain the holder in firm engagement. Then, when it is desired to remove the holder from the bottle, the handle is pressed down and the inclined portions $4^c$ engage between the leg portions $3^b$ so as to open the bottle gripping members which turn outwardly about their points of pivotal connection. In this way, the holder can be readily removed.

Thus, I have devised not only an efficient form of handle which can be readily applied to and removed from the neck of a bottle and which can be maintained in firm engagement therewith without danger of accidental release, but at the same time, I have devised a form of holder which is of comparatively simple structure and hence not costly to manufacture.

Other devices of this same general nature have been patented but some of them are objectionable because of their prohibitive cost while others are not dependable in their operation. The present device possesses both economy and a high degree of efficiency, and is hence calculated to prove extremely practical in every respect.

It is to be understood that the same invention may be embodied in handles or carriers for other forms of bottles and the following claims are intended to comprehend such modifications.

What I claim is:

1. A carrier for milk bottles comprising duplicate, separate bottle-gripping members, each of said members having a substantially semi-circular portion and depending leg portions at the ends thereof and at right angles thereto, said leg portions being pivotally connected at their bottom ends, and a bail handle member having end portions engaging said leg portions so as to open and close the bottle-gripping members.

2. A carrier for milk bottles comprising duplicate, separate bottle-gripping members, each of said members having a substantially semi-circular portion and depending leg portions at the ends thereof and at right angles thereto, said bottle-gripping members each having an eye at the bottom end of one leg and a hook at the bottom end of the other leg thereof, the bottle-gripping members being reversely arranged for pivotal interengagement between said hooks and eyes, and a bail handle member having end portions engaging said leg portions so as to open and close the bottle-gripping members.

3. A carrier for milk bottles comprising duplicate, separate bottle-gripping members, each of said members having a substantially semi-circular portion and depending leg portions at the ends thereof and at right angles thereto, said bottle-gripping members each having an eye at the bottom end of one leg and a hook at the bottom end of the other leg thereof, the bottle-gripping members being reversely arranged for pivotal interengagement between said hooks and eyes, and a bail handle member having looped end portions engaging about said leg portions and adapted to slide therealong for closing the bottle-gripping members, and said handle having also means adapted for wedging engagement between said leg portions so as to open the bottle gripping members.

4. A carrier for milk bottles comprising duplicate, separate bottle-gripping members, each of said members having a substantially semi-circular portion and depending leg portions at the ends thereof and at right angles thereto, said bottle-gripping members each having an eye at the bottom end of one leg and a hook at the bottom end of the other leg thereof, the bottle-gripping members being reversely arranged for pivotal interengagement between said hooks and eyes, and a bail handle member having looped end portions engaging about the said leg portions and adapted to slide therealong for closing the bottle-gripping members, and said handle having also a shoulder portion above the corresponding looped end portion, said shoulder being adapted to wedge between said leg portions, upon lowering the handle, so as to open the bottle-gripping members.

5. A carrier for milk bottles comprising separate bottle-gripping members, each of said members having a substantially semi-circular portion and depending leg portions at the ends thereof and at right angles thereto, said leg portions being pivotally connected at their lower ends, and a bail handle member having end portions engaging between and about said leg portions so as to open and close the bottle-gripping members.

6. A carrier for milk bottles comprising separate bottle-gripping members, each of said members having a substantially semi-circular portion and depending leg portions at the ends thereof and at right angles thereto, said leg portions being pivotally connected at their lower ends, and a bail handle member having substantially horizontally disposed looped bottom leg portions, said bail handle member having portions extending upwardly and outwardly from the inner sides of said looped end portions and extending between said depending leg portions so as to constitute a means for opening said bottle-gripping members, upon lowering of the handle member.

In testimony whereof, I hereby affix my signature.

HARRY G. CATHCART.